United States Patent
Mu et al.

(10) Patent No.: US 11,999,856 B2
(45) Date of Patent: Jun. 4, 2024

(54) METHOD FOR MECHANOCHEMICAL PREPARATION OF HIGH TEMPERATURE-RESISTANT BISMUTH YELLOW PIGMENT

(71) Applicant: LANZHOU INSTITUTE OF CHEMICAL PHYSICS, CHINESE ACADEMY OF SCIENCES, Lanzhou (CN)

(72) Inventors: Bin Mu, Lanzhou (CN); Aiqin Wang, Lanzhou (CN); Xiaowen Wang, Lanzhou (CN); Aiping Hui, Lanzhou (CN); Yuru Kang, Lanzhou (CN); Wenbo Wang, Lanzhou (CN); Li Zong, Lanzhou (CN); Yongfeng Zhu, Lanzhou (CN); Qin Wang, Lanzhou (CN)

(73) Assignee: LANZHOU INSTITUTE OF CHEMICAL PHYSICS, CHINESE ACADEMY OF SCIENCES, Gansu (CN)

( * ) Notice: Subject to any disclaimer, the term of this patent is extended or adjusted under 35 U.S.C. 154(b) by 580 days.

(21) Appl. No.: 17/269,803

(22) PCT Filed: Jul. 12, 2019

(86) PCT No.: PCT/CN2019/095877
§ 371 (c)(1),
(2) Date: Feb. 19, 2021

(87) PCT Pub. No.: WO2020/113961
PCT Pub. Date: Jun. 11, 2020

(65) Prior Publication Data
US 2021/0317316 A1    Oct. 14, 2021

(30) Foreign Application Priority Data
Dec. 6, 2018 (CN) .......................... 201811489453.X

(51) Int. Cl.
C09C 1/00 (2006.01)
C09C 3/00 (2006.01)
C09C 3/04 (2006.01)

(52) U.S. Cl.
CPC ............ *C09C 1/0006* (2013.01); *C09C 3/006* (2013.01); *C09C 3/041* (2013.01); *C09C 3/043* (2013.01);
(Continued)

(58) Field of Classification Search
CPC .............. C01P 2002/72; C01P 2006/37; C01P 2006/62; C01P 2006/63; C01P 2006/64;
(Continued)

(56) References Cited

U.S. PATENT DOCUMENTS 5,399,335 A * 3/1995 Sullivan ................ C09C 1/0006
423/594.7

FOREIGN PATENT DOCUMENTS

| CN | 101070435 A | 11/2007 |
| CN | 104693841 A | 6/2015 |

(Continued)

OTHER PUBLICATIONS

Du et al., "Preparation of Bismuth Vanadate Pigment by Solid-state Calcination," Iron Steel Vanadium Titanium, vol. 37, No. 5, Oct. 2016, 8 pages.

*Primary Examiner* — Shuangyi Abu Ali
(74) *Attorney, Agent, or Firm* — Muncy, Geissler, Olds & Lowe, P.C.

(57) ABSTRACT

The present disclosure relates to a method for preparation of a high temperature-resistant bismuth yellow pigment. The method comprises: mixing an oxide which served as a matrix and dopan with a bismuth source, a vanadium source, or a molybdenum source, and then placing the mixture into a mill for grinding to obtain a precursor; further calcining (Continued)

and crushing the precursor to obtain the high temperature-resistant bismuth yellow pigment powder. The bismuth yellow pigment has a bright color, a b* value greater than 90, a stable performance, and a high heat-resistance above 800° C. The method is environmentally friendly without waste, and reaction conditions are simple. Doping of $BiVO_4$ crystal lattices by incorporation of oxides can be achieved, so that the particle size and distribution of the bismuth yellow pigment can be effectively controlled while the color performance of the bismuth yellow pigment is greatly improved.

6 Claims, 2 Drawing Sheets

(52) U.S. Cl.
CPC ...... *C01P 2006/37* (2013.01); *C01P 2006/62* (2013.01); *C01P 2006/63* (2013.01); *C01P 2006/64* (2013.01)

(58) Field of Classification Search
CPC .............. C01P 2002/74; C01P 2002/88; C09C 1/0006; C09C 3/006; C09C 3/041; C09C 3/043; C09C 3/063
See application file for complete search history.

(56) References Cited

FOREIGN PATENT DOCUMENTS

| | | | |
|---|---|---|---|
| CN | 106554643 | A | 4/2017 |
| CN | 107601561 | A | 1/2018 |
| CN | 107760062 | A | 3/2018 |
| CN | 107760063 | A | 3/2018 |
| CN | 107955410 | A | 4/2018 |
| CN | 109439021 | A | 3/2019 |

* cited by examiner

METHOD FOR MECHANOCHEMICAL PREPARATION OF HIGH TEMPERATURE-RESISTANT BISMUTH YELLOW PIGMENT

CROSS REFERENCE TO RELATED APPLICATIONS

This application is the national phase entry of International Application No. PCT/CN2019/095877, filed on Jul. 12, 2019, the entire contents of which are incorporated herein by reference.

TECHNICAL FIELD

The disclosure relates to a method for preparation of a high temperature-resistant bismuth yellow pigment, especially a mechanochemical method for preparation of high temperature-resistant bismuth yellow pigment, which belongs to the technical field of inorganic pigments.

BACKGROUND

Coloring is the basic attribute of pigments, and our living environment has become colorful because of pigments. According to the data, people are only most sensitive to the light in the wavelength range of 400-700 nm, especially the light at 555 nm with a yellow-green hue. Therefore, as a high-visible warning color pigment, yellow inorganic pigments are widely used in traffic, roads and hoisting machinery where people need to be highly visible. Bismuth yellow is a new environmentally-friendly yellow inorganic pigment with bismuth vanadate ($BiVO_4$) as the main color component, and the reflectivity to light at 580 nm is as high as that of cadmium yellow and lead chrome yellow. Compared with chrome yellow and organic pigments, it has good dispersibility, strong hiding power, high main hue, good thermal stability and solvent resistance. Furthermore, it exhibits a high chroma compared with iron yellow and nickel titanate. Both the saturated color and light hue, bismuth yellow has good weather resistance, and its acid resistance is comparable to that of lead chrome yellow, and thus it can directly replace the traditional cadmium yellow and chrome yellow without being mixed with organic yellow pigments to be used in automotive topcoats, industrial coatings, rubber products, plastic products and printing ink coloring and other occasions with high performance requirements. It is expected to fundamentally solve the problem of heavy metal poisoning in the production and use of yellow pigments. However, bismuth yellow pigment is expensive, and especially its heat resistance is poor due to the price of bismuth and vanadium raw materials and the technical defects of the traditional solid-phase method. Therefore, there is an urgent need to develop a green process for preparation of the low-cost and high-temperature resistant bismuth yellow pigments.

At present, the preparation methods of bismuth yellow pigments mainly include the traditional solid phase method (ZL201310655215.2) and the chemical precipitation method (CN107760062A, CN107601561A, CN101070435A). The traditional solid phase method involves bismuth and vanadium oxides as the raw materials, which are ground and mixed according to the formula, and then calcined to directly obtain (or after being re-grinded) the ultrafine powders based on a solid phase reaction. This preparation method is time-consuming, energy-consuming, low-efficiency, and large size, and the impurities are easily to be introduced. By contrast, the pigment prepared by the co-precipitation method possesses small particle size and high purity, and the calcination temperature is lower than that of the solid phase reaction and easy to control. However, the preparation process is complicated and consumes a lot of acid and alkali accompanied with the production of waste water. It has higher preparation cost, and is easy to cause the hard agglomeration of the powder and the self-growth of the crystal grains during the heat treatment. In addition, the yield of the pigment prepared by the liquid phase method is lower than that of the solid phase method, and it is difficult to promote on a large scale in actual industrial production. In order to improve the heat resistance of bismuth yellow pigments, the common method is to coat a layer of solid deposits (e.g. phosphate, silica, zinc borate, etc.) on the surface of bismuth vanadate (CN107955410A, CN104693841A, CN106554643A), but the preparation procedure is complicated, and the introduction of boron element reduces the environmental safety of bismuth yellow pigments.

Mechanochemistry involves the mechanical energy to induce the chemical reactions and changes in the tissue, structure and properties of materials to prepare new materials or modify materials. Therefore, mechanochemistry has been widely used in the preparation of inorganic nanomaterials in recent years. There are lots of advantages using mechanical activation for preparation of nanomaterials, such as simple equipment, high yield, low-price, green and eco-friendly process. Compared with the traditional solid phase method, mechanochemistry can induce the reaction between the materials with the decrease in the particle size of the materials. Therefore, mechanochemical preparation of bismuth yellow pigments not only can reduce the production cost, but also improve the performance of the pigments without discharging of pollutants.

SUMMARY

The present disclosure aims at the preparation technology and performance defects of bismuth yellow pigments, and to provide a method for mechanochemical preparation of a high temperature-resistant bismuth yellow pigment.

1. Preparation of High Temperature-Resistant Bismuth Yellow Pigments

The preparation process of a high temperature-resistant bismuth yellow pigment is mainly comprised the following steps in the disclosure: the oxides are served as a matrix and dopant, which are mixed with bismuth source, vanadium source or molybdenum source, and then the mixture is placed into a planetary ball mill for grinding to obtain a precursor, and the high temperature-resistant bismuth yellow pigment powder is obtained after the precursor is calcined and crushed.

The oxides as the matrix and the dopant are composed of silica, aluminum oxide and divalent metal oxide with a mass ratio of 1:0.1:0.1-0.1:2:1, wherein the divalent metal oxide is one of magnesium oxide, calcium oxide, strontium oxide, and barium oxide at least. The addition mass of the oxides as the matrix and the dopant is 1-4 times of the bismuth source mass.

The bismuth source is one of bismuth nitrate, bismuth sulfate, bismuth chloride, bismuth acetate, and bismuth oxide at least.

The vanadium source is any one of ammonium metavanadate, sodium metavanadate, sodium vanadate and vanadium pentoxide, and the mass ratio of the bismuth source to the vanadium source is 1: 1-1:5.

The molybdenum source is any one of sodium molybdate, ammonium molybdate or potassium molybdate, and the mass ratio of the bismuth source to the molybdenum source is 1: 20-1:0.25.

The mass ratio of ball to material is selected to 5-50, the grinding speed is 100-1200 rpm, and the grinding time is 30-360 min during grinding.

The calcination temperature of the precursor is 300-800° C., and the calcination time is 30-240 min. 2. Characterization of structure and performance of the high temperature resistant bismuth yellow pigment (1) X-Ray Diffraction Pattern of the Bismuth Yellow Hybrid Pigment FIG. 1 is the X-ray diffraction patterns of the as-prepared bismuth yellow pigments in Examples 1-5. The characteristic diffraction peaks of monoclinic scheelite $BiVO_4$ are observed at 2θ=18.9°, 28.9°, 30.6°, 34.4°, 35.1°, 39.7°, 42.4°, 46.6°, 47.1°, 53.2°, 58.4° and 59.5°, which are corresponded to the crystal planes (011), (121), (040), (200), (002), (211), (051), (060), (042), (−161), (−321) and (123), respectively. By comparison, it is found that no other diffraction peaks appear in the X-ray diffraction patterns of the prepared bismuth yellow pigments, indicating that $Al^{3+}$, $Si^{4+}$, $Mg^{2+}$ and $Ca^{2+}$ of the oxides are doped into the lattice of $BiVO_4$ crystal after the calcination treatment.

(2) Thermogravimetric Curve of the Bismuth Yellow Hybrid Pigment

FIG. 2 is the thermogravimetric curves of the bismuth yellow pigment S-1 prepared by the present disclosure and the commercially available bismuth yellow pigment. It can be seen from FIG. 2 that the residual solids of S-1 and commercial bismuth yellow samples at 1000° C. are 99.36% and 96.45%, respectively, indicating that the bismuth yellow pigment prepared by the present disclosure exhibits good thermal stability. At the same time, the yellow value b* of the prepared bismuth yellow pigment can still reach above 74 when the calcination temperature is increased to 800° C. However, when the calcination temperature reaches 700° C., the b* value of the commercially available bismuth yellow pigment has dropped to 60.36, as shown in Table 1.

TABLE 1

L*, a* and b* values of the bismuth yellow pigment and commercially available bismuth yellow pigment $BiVO_4$ after calcination

| Sample | Calcination temperature(° C.) | L* | a* | b* |
|---|---|---|---|---|
| S-1 | 800 | 75.67 | 1.55 | 74.86 |
| Commercial bismuth yellow | 700 | 67.57 | 18.78 | 60.36 |

(3) Color Performance of the Bismuth Yellow Hybrid Pigment

The colorimetric values and reflectance spectra of the samples prepared in the examples were characterized by Commission Internationale de l'Eclairage (CIE) 1976 L*a*b* colorimetric method using Color-Eye automatic differential colorimeter. As shown in Table 1, the bismuth yellow pigment prepared by the present disclosure has a high b* value and a low a* value, and the b* value is greater than 90, indicating that it has a higher yellow phase and a lower red phase, and the color of the sample is bright yellow.

It is well-known that the chromaticity of metal oxide pigments is closely related to the band gap energy, that is, the energy difference between the valence band and the conduction band (Sci. Am., 1980, 243, 124-154; Mater. Lett., 2018, 214, 228-231). The valence band of the monoclinic scheelite $BiVO_4$ includes $Bi_{6s}$ and $O_{2p}$ hybrid orbitals, and the main $V_{3d}$ orbital and the secondary $Bi_{6p}$ orbital in the $VO_4$ tetrahedron. The coloring mechanism of the monoclinic scheelite $BiVO_4$ is also caused by the charge transfer of the above-mentioned valence band conduction band (J. Alloy. Compd., 2016, 686, 533-539). Therefore, the color of $BiVO_4$ can be easily adjusted by doping with other elements. Compared with the UV-vis diffuse reflectance spectra (FIG. 3) and the maximum absorption edge of the Kubelka-munk plot curves (FIG. 4), it is found that $Al^{3+}$, $Si^{4+}$, $Mg^{2+}$, $Ca^{2+}$, $Ba_{=+}$ or other ions of the oxides enter into the $BiVO_4$ lattice after the precursor is calcined, causing the distortion and deformation of the lattice, thereby further changing the $O_{2p}$ valence band, and reducing the band gap energy by changing the $Bi_{6s}/O_{2p}$ hybrid orbital. Therefore, the present disclosure introduces the oxides to prepare a bismuth yellow pigment, in which the charge transfer between the conduction band and valence band has changed, and thus the involved oxides are not only the matrix material supporting bismuth yellow nanoparticles, but also dopant adjusting the color of bismuth yellow pigment during the preparation process.

In summary, there are some advantages of the method for mechanochemical preparation of high temperature-resistant bismuth yellow pigment in the present disclosure as follows:

1. The preparation process of the mechanical grinding method is green and eco-friendly, and there are no three wastes;
2. The reaction conditions are simple. Incorporation of the oxides such as $SiO_2$, $Al_2O_3$ and MgO realizes the doping of the $BiVO_4$ lattice, which greatly improves the color performance of the yellow bismuth pigment, and effectively controls the particle size and size distribution of the yellow bismuth pigment as well;
3. The heat resistance of bismuth yellow pigment can be significantly improved and reach above 800° C. without coating a layer of solid deposit (zinc phosphate/calcium, silicon dioxide, zinc borate, etc.) on the surface of bismuth vanadate based on the doping of the oxides.

DETAILED DESCRIPTION

Figure 1:
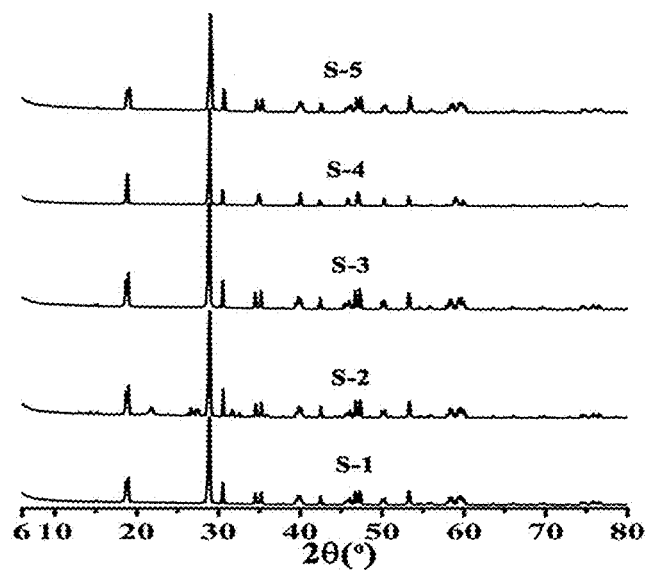
FIG. 1 is the X-ray diffraction spectra of the bismuth yellow pigments prepared in Examples 1-5.
Figure 2:
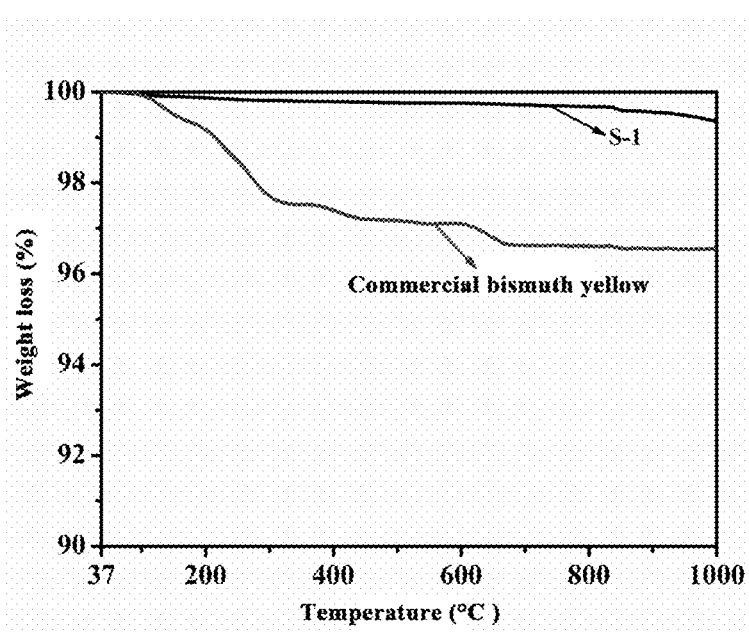
FIG. 2 is the thermogravimetric curves of the bismuth yellow pigment prepared in Example 1 and the commercially available bismuth yellow pigment.
Figure 3:
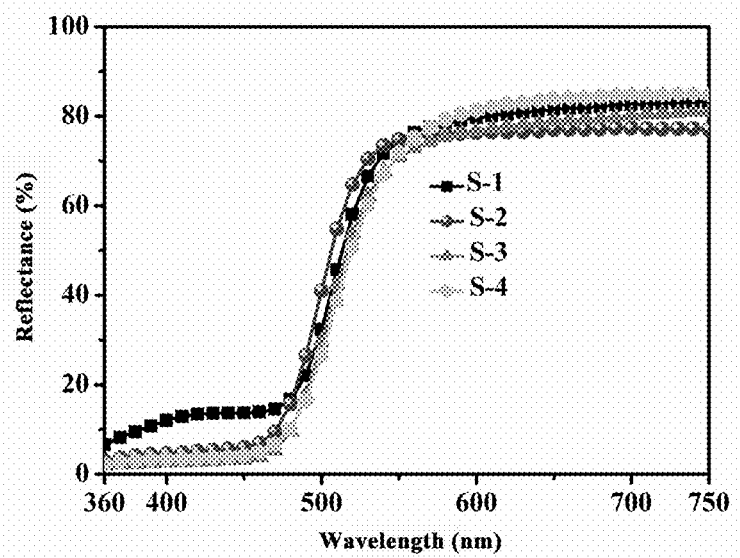
FIG. 3 is the UV-vis diffuse reflectance spectra of the high temperature-resistant bismuth yellow pigments prepared in Examples 1-4.
Figure 4:
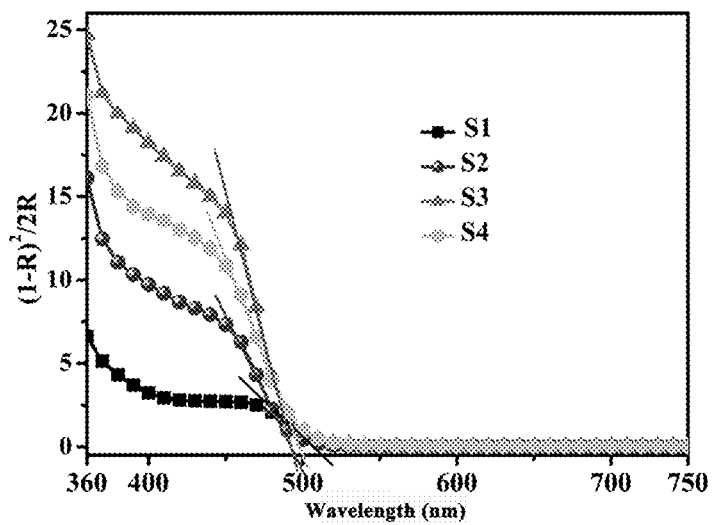
FIG. 4 is the Kubelka-munk plots of the high temperature-resistant bismuth yellow pigments prepared in Examples 1-4.

The preparation and performance of the high temperature-resistant bismuth yellow pigment of the present disclosure will be further illustrated by specific embodiments below.

Example 1

0.243 g of bismuth nitrate, 0.116 g of ammonium metavanadate, 0.200 g of silica, 0.400 g of alumina and 0.100 g of magnesium oxide were mixed and put into a 50 mL zirconium dioxide ball mill. 20 g of zirconium dioxide balls with a diameter of 2 mm and a ball to material ratio of 20 was added and ground at 600 rpm for 120 min, and then the prepared precursor was calcined at 700° C. for 1 h to obtain a bright yellow bismuth yellow pigment, marked as S-1, and the color parameters of L*, a* and b* were shown in Table 2.

Example 2

0.157 g of bismuth chloride, 0.276 g of sodium vanadate, 0.200 g of silica, 0.200 g of alumina and 0.200 g of calcium oxide were mixed and put into a 50 mL zirconium dioxide ball mill. 10 g of zirconium dioxide balls with a diameter of 2 mm and a ball to material ratio of 10 was added and ground at 500 rpm for 180 min; the prepared precursor was calcined at 600° C. for 90 min to obtain a bright yellow bismuth yellow pigment, marked as S-2, and the color parameters of L*, a* and b* were shown in Table 2.

Example 3

0.122 g of bismuth nitrate, 0.078 g of bismuth chloride, 0.117 g of ammonium metavanadate, 0.242 g of sodium molybdate, 0.300 g of silica, 0.200 g of alumina and 0.200 g of magnesium oxide were mixed and put into a 50 mL zirconium dioxide ball mill. 39 g of zirconium dioxide balls with a diameter of 2 mm and a ball to material ratio of 30 was added and ground at 700 rpm for 180 min; the prepared precursor was calcined at 500° C. for 240 min to obtain a bright yellow bismuth yellow pigment, marked as S-3, and the color parameters of L, a* and b* were shown in Table 2.

Example 4

0.353 g of bismuth sulfate, 0.029 g of ammonium metavanadate, 0.122 g of sodium molybdate, 0.300 g of silica, 0.200 g of alumina and 0.18 g of barium oxide were mixed and put into a 50 mL zirconium dioxide ball mill. 6 g of zirconium dioxide balls with a diameter of 2 mm and a ball to material ratio of 5 was added and ground at 800 rpm for 240 min; the prepared precursor was calcined at 800° C. for 90 min to obtain a bright yellow bismuth yellow pigment, marked as S-4, and the color parameters of L, a* and b* were shown in Table 2.

Example 5

0.233 g of bismuth oxide, 0.182 g of vanadium pentoxide, 0.200 g of silica, 0.300 g of aluminum oxide and 0.100 g of magnesium oxide were mixed and put into a 50 mL zirconium dioxide ball mill. 20 g of zirconium dioxide balls with a diameter of 2 mm and a ball to material ratio of 20 was added and ground at 800 rpm for 360 min; the prepared precursor was calcined at 400° C. for 120 min to obtain a bright yellow bismuth yellow pigment, marked as S-5, and the color parameters of L, a* and b* were shown in Table 2.

TABLE 2

L*, a*, b* values of the bismuth yellow hybrid pigments prepared in Examples 1-5

| Samples | L* | a* | b* |
| --- | --- | --- | --- |
| S-1 | 82.34 | 1.00 | 92.07 |
| S-2 | 82.97 | 5.15 | 90.25 |
| S-3 | 83.78 | −0.48 | 91.17 |
| S-4 | 81.61 | 5.58 | 92.54 |
| S-5 | 83.55 | −4.6 | 91.38 |

What is claimed is:

1. A method for preparation of a high temperature-resistant bismuth yellow pigment above 800° C., comprising the following steps:
    mixing oxides served as a matrix and dopant with bismuth source, and vanadium source or vanadium and molybdenum source to obtain a mixture,
    placing the mixture into a mill for grinding to obtain a precursor; and
    calcining and crushing the precursor to obtain the high temperature-resistant bismuth yellow pigment,
    wherein the oxides served as the matrix and the dopant are composed of silica, aluminum oxide and divalent metal oxides with a mass ratio of 1:0.1:0.1-1:20:10,
    wherein a mass ratio of ball to the mixture is 5-50, a grinding speed is 100-1200 rpm, and a grinding time is 30-360 min during grinding, and
    wherein a calcination temperature of the precursor is 300-800° C., and a calcination time is 30-240 min.

2. The method for preparation of the high temperature-resistant bismuth yellow pigment above 800° C. according to claim 1, wherein the divalent metal oxide comprises at least one of magnesium oxide, calcium oxide, strontium oxide, and barium oxide.

3. The method for preparation of the high temperature-resistant bismuth yellow pigment above 800° C. according to claim 1, wherein an amount of the oxides as the matrix and the dopant is 1-4 times of an amount of the bismuth source.

4. The method for preparation of the high temperature-resistant bismuth yellow pigment above 800° C. according to claim 1, wherein the bismuth source comprises at least one of bismuth nitrate, bismuth sulfate, bismuth chloride, bismuth acetate, and bismuth oxide.

5. The method for preparation of the high temperature-resistant bismuth yellow pigment above 800° C. according to claim 1, wherein the vanadium source is any one of ammonium metavanadate, sodium metavanadate, sodium vanadate and vanadium pentoxide, and a mass ratio of the bismuth source to the vanadium source is 1:1-1:5.

6. The method for preparation of the high temperature-resistant bismuth yellow pigment above 800° C. according to claim 1, wherein the molybdenum source is any one of sodium molybdate, ammonium molybdate or potassium molybdate, and a mass ratio of the bismuth source to the molybdenum source is 1:20-1:0.25.

* * * * *